US006965178B2

(12) United States Patent
Takahashi et al.

(10) Patent No.: US 6,965,178 B2
(45) Date of Patent: Nov. 15, 2005

(54) MOTOR

(75) Inventors: Terumitsu Takahashi, Kosai (JP);
Masashi Yamamura, Hamamatsu (JP);
Kazutoshi Ito, Hamamatsu (JP);
Hikoshi Izumi, Gyoda (JP); **Kenji
Matsushima, Gyoda (JP); Makoto
Iizuka**, Gyoda (JP)

(73) Assignees: Asmo Co., Ltd., Kosai (JP); **Jeco Co.,
Ltd.**, Gyoda (JP)

( * ) Notice: Subject to any disclaimer, the term of this patent is extended or adjusted under 35 U.S.C. 154(b) by 165 days.

(21) Appl. No.: 10/620,543

(22) Filed: Jul. 16, 2003

(65) Prior Publication Data

US 2004/0046480 A1    Mar. 11, 2004

(30) Foreign Application Priority Data

Jul. 19, 2002   (JP)   .............................. 2002-211011

(51) Int. Cl.[7] .......................... H02K 5/15; H02K 13/00; H02K 15/03
(52) U.S. Cl. ............................. 310/68 R; 310/40 MM; 310/42; 310/89; 310/239; 310/242
(58) Field of Search ..................... 310/40 MM, 42, 310/89, 91, 239, 240, 241, 242, 68 R

(56) References Cited

U.S. PATENT DOCUMENTS

| | | | | |
|---|---|---|---|---|
| 4,853,576 A | * | 8/1989 | Mayumi et al. ............. | 310/239 |
| 4,893,043 A | * | 1/1990 | Baines ........................ | 310/239 |
| 5,243,245 A | * | 9/1993 | Oba ............................ | 310/89 |

FOREIGN PATENT DOCUMENTS

| | | | | |
|---|---|---|---|---|
| JP | 53072108 A | * | 6/1978 | .......... H02K 23/04 |
| JP | 2001-112209 | | 4/2001 | |
| JP | 2001-333556 | | 11/2001 | |

* cited by examiner

Primary Examiner—Darren Schuberg
Assistant Examiner—David W. Scheuermann
(74) Attorney, Agent, or Firm—Colin P. Cahoon; Christopher P. O'Hagan; Carstens & Cahoon, LLP

(57) ABSTRACT

A yoke is substantially cylindrical and has an opening portion. A brush holder member is secured to the opening portion of the yoke. The brush holder member retains a pair of supply brushes. A housing member is secured to the opening portion of the yoke on the outside of the brush holder member and covers the opening portion. A pair of securing pieces is formed integrally with the yoke. The securing pieces secure the brush holder member and the housing member to the yoke.

15 Claims, 6 Drawing Sheets

MOTOR

BACKGROUND OF THE INVENTION

The present invention relates to a motor that has a yoke to which housing members, such as a brush holder member and an end flame, are secured.

A typical motor includes a DC motor, which supplies power to an armature by supply brushes. Such a motor includes a substantially cylindrical yoke. Magnets are secured to the inside of the yoke. A brush holder member and an end flame (housing member) are secured to an opening portion of the yoke. The brush holder member retains supply brushes. The end flame covers the opening portion of the yoke. In such a motor, the brush holder member is secured to the end flame first. The end flame is then secured to the opening portion of the yoke. For example, a threaded bore is formed through a metal plate that is integrally formed (insert mold) with the brush holder member. The end flame is secured to the brush holder member with a screw, which is tightened to the threaded bore through the end flame. The end flame is further secured to the opening portion with a screw. As a result, each brush holder member is secured to the yoke.

However, in the above mentioned motor, many screws are required. Thus, the number of parts and assembling processes are increased, which increases the manufacturing cost of the motor.

Also, in the above mentioned motor, the brush holder member is secured to the end flame first, and the end flame is then secured to the yoke. That is, the brush holder member is secured to the yoke with the end flame. Therefore, displacement of the supply brushes with respect to the magnets, that is, displacement of the supply brushes from a predetermined circumferential position, is likely to increase. This causes variation in the rotational performance of the motor.

SUMMARY OF THE INVENTION

Accordingly, it is an objective of the present invention to provide a motor that has a reduced number of parts and reduces displacement of supply brushes with respect to magnets.

To achieve the above objective, the present invention provides a motor, which includes a yoke, a brush holder member, a housing member, and a securing member. The yoke is substantially cylindrical and has an opening portion. Magnets are secured to the inside of the yoke. The brush holder member is secured to the opening portion of the yoke and retains a supply brush. The housing member is secured to the opening portion of the yoke on the outside of the brush holder member and covers the opening portion. The securing member is formed integrally with the yoke. The securing member secures the brush holder member and the housing member to the yoke.

The present invention also provides a motor, which includes a yoke, a pair of magnets, a brush bolder member, a housing member, and a pair of securing pieces. The yoke is substantially cylindrical and has an opening portion. The magnets are secured to the inside of the yoke. The brush holder member is secured to the opening portion of the yoke and retains a pair of supply brushes. The housing member is secured to the opening portion of the yoke on the outside of the brush holder member. The housing member covers the opening portion. The securing pieces are formed integrally with the yoke. The securing pieces secure the brush holder member and the housing member to the yoke.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
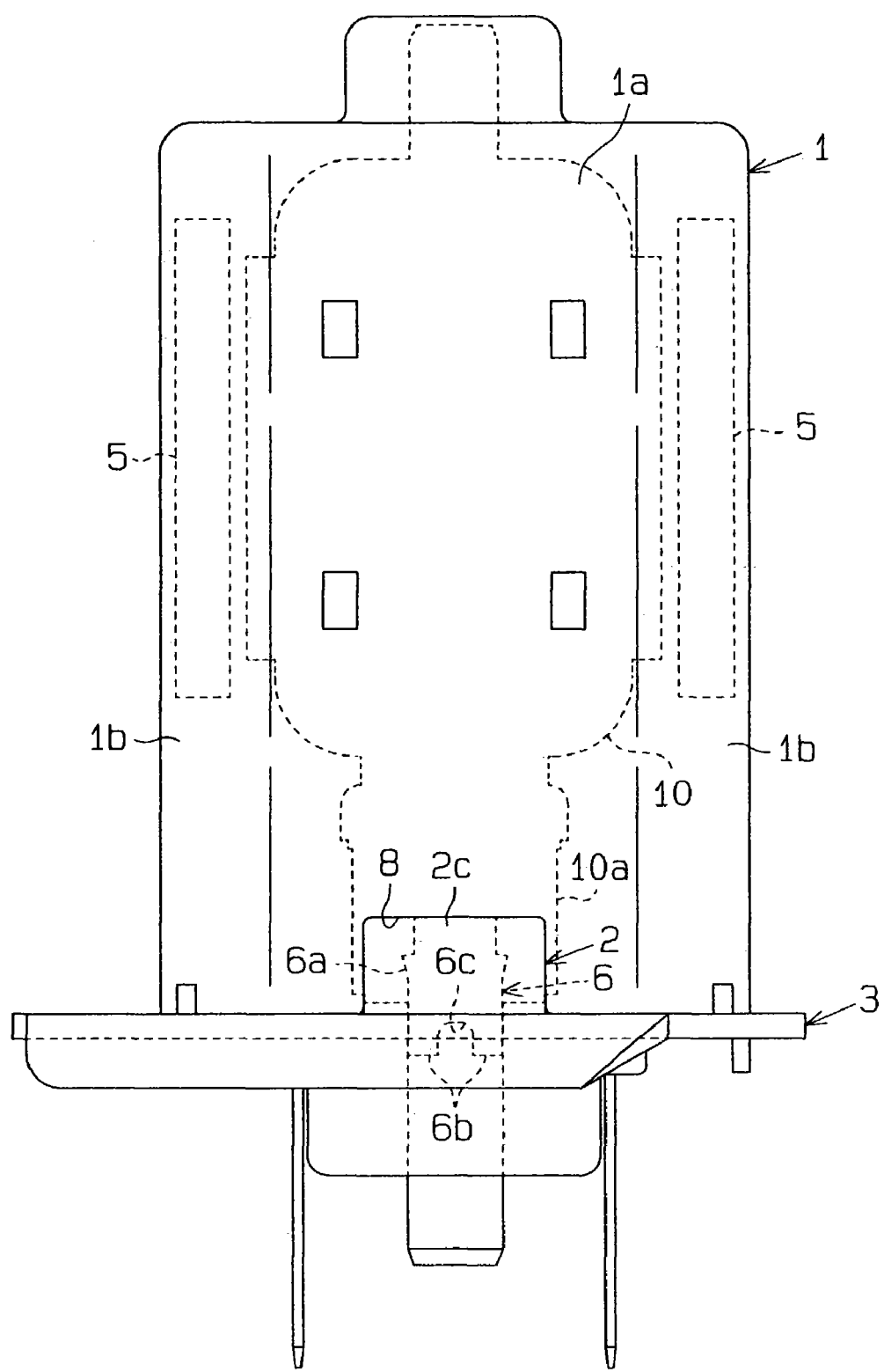
FIG. 1 is a side view illustrating a motor according to a preferred embodiment of the present invention.
Figure 2:
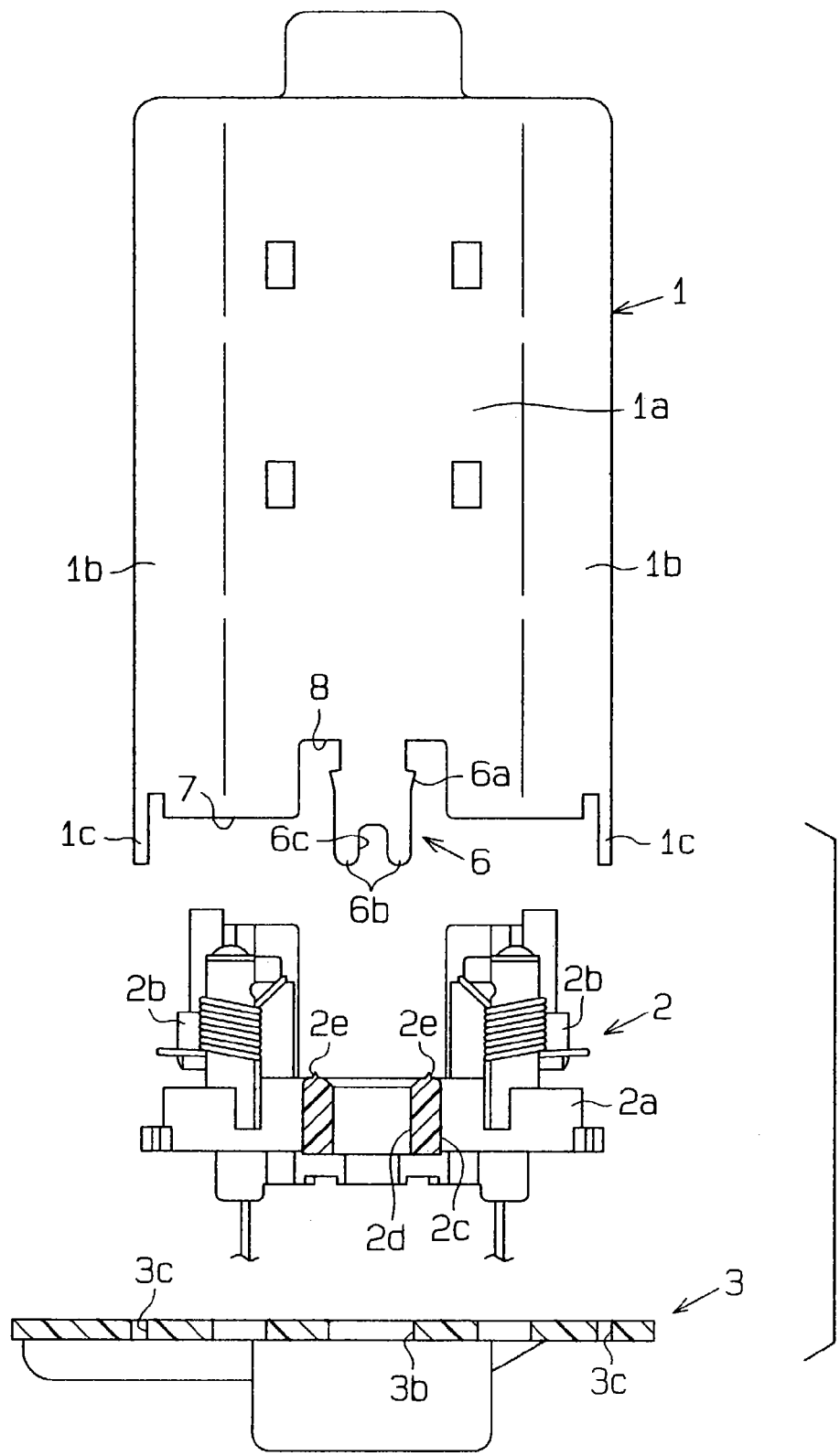
FIG. 2 is an exploded diagram illustrating the motor according to the preferred embodiment.

A preferred embodiment of the present invention will now be described with reference to FIGS. 1 to 4. As shown in FIGS. 1 and 2, a motor includes a yoke 1, a brush holder member 2, and a housing member, which is an end flame 3 in this embodiment.

The yoke 1 is substantially cylindrical. The yoke 1 of the preferred embodiment is flattened, and has a pair of flat portions 1a (only one is shown in FIGS. 1 and 2) and a pair of curved portions 1b, which connect the flat portions 1a. Two magnets 5 are secured to the inside of the yoke 1. Each magnet 5 is secured to the inner surface of one of the curved portions 1b.

As shown in FIG. 2, securing members, which are securing pieces 6 for securing the brush holder member 2 and the end flame 3, are integrally formed with the yoke 1. More specifically, as shown in FIG. 2, cut-out portions 8, which extend upward, are formed at the rim of a lower opening portion 7 of the yoke 1. Each cut-out portion 8 is formed at the substantial center of the corresponding flat portion 1a. Each securing piece 6 extends downward from the substantial center of the bottom of one of the cut-out portions 8. The thickness of the securing pieces 6 is the same as the thickness of the yoke 1 (flat portions 1a). Each securing piece 6 is formed such that the securing piece 6 and the corresponding flat portion 1a of the yoke 1 are located on the same plane before being secured to the brush holder member 2 and the end flame 3. A pair of engaging portions 6a is formed on both sides of the middle portion of each securing piece 6 for locking the brush holder member 2.

Each engaging portion 6a is formed such that the width of the engaging portion 6a increases toward the proximal end of the corresponding securing piece 6. A foldable securing portion 6b is formed at the distal end of each securing piece 6 for securing the end flame 3. Each securing piece 6 has a slit 6c, which extends from the center of the distal end of the securing piece 6 toward the proximal end of the securing piece 6. Each slit 6c of the preferred embodiment is short of the middle of the corresponding securing piece 6 (the engaging portion 6a). Thus, the foldable securing portion 6b is divided into two and is easy to be folded. The distal ends of the foldable securing portion 6b, which is divided into two, are chamfered. Also, a pair of engaging pieces 1c, which face each other, extends from the rim of the opening portion 7. Each engaging piece 1c extends from one of the curved portions 1b.

Figure 3A:
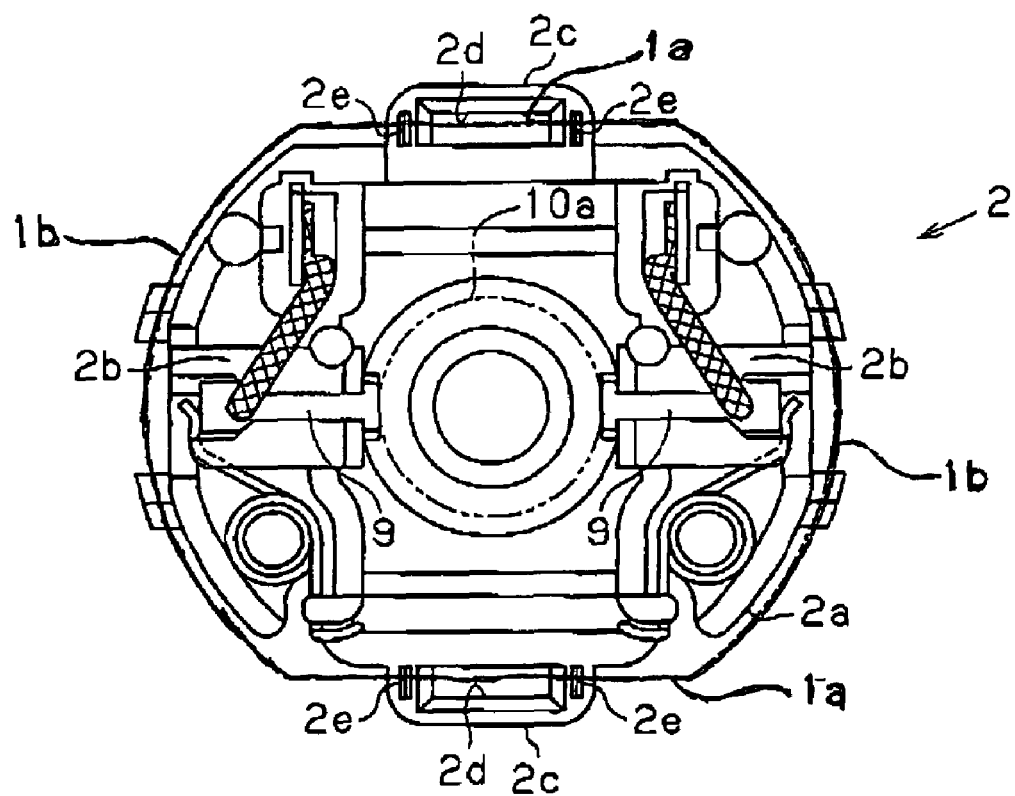
FIG. 3(a) is a plan view illustrating a brush holder member according to the preferred embodiment.
Figure 3A:
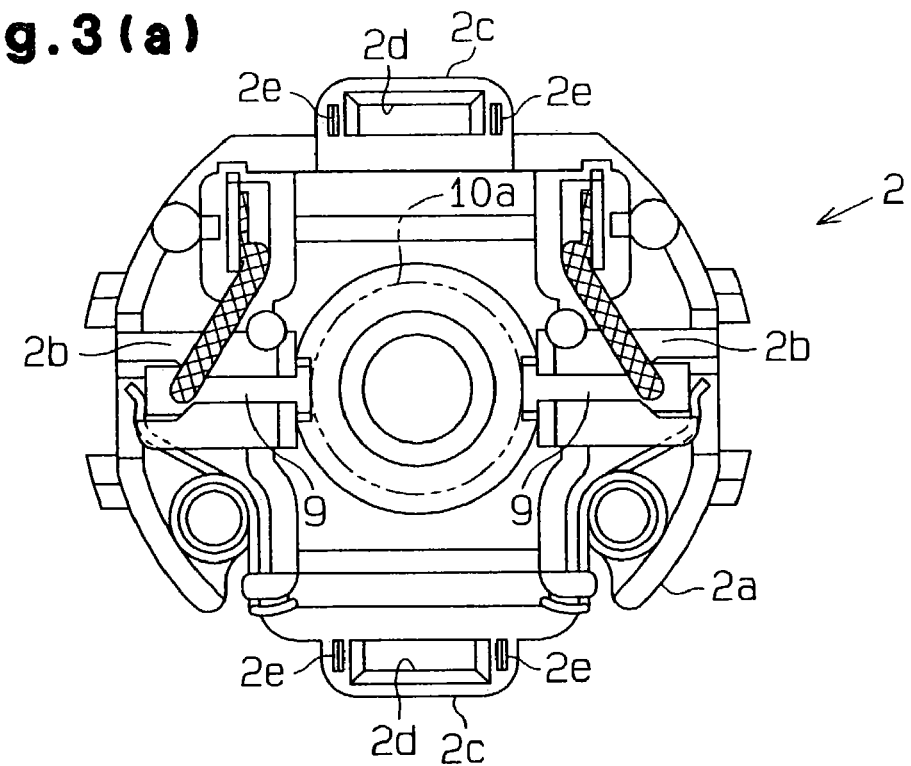
Figure 3B:
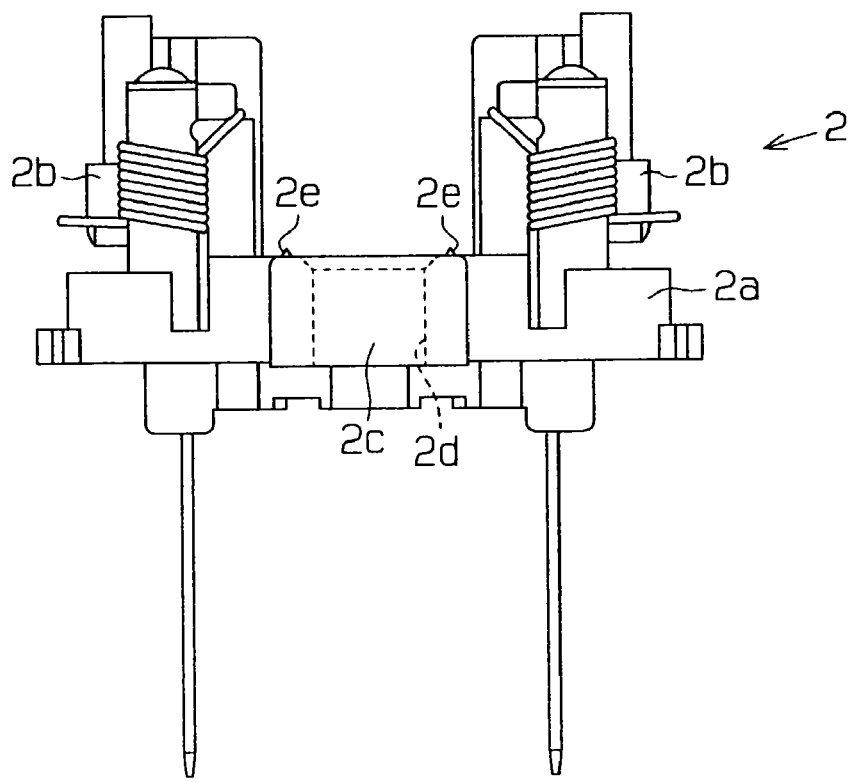
FIG. 3(b) is a side view illustrating the brush holder member.

As shown in FIGS. 2, 3(a), and 3(b), the brush holder member 2 is made of resin material and includes a disk portion 2a, which corresponds to the inside of the opening portion 7 of the yoke 1; and a pair of holders 2b, which is located on the disk portion 2a and retains a pair of supply brushes 9 (see FIG. 3(a)). A pair of extended portions 2c extends radially outward from positions of the brush holder member 2 corresponding to the cut-out portions 8. A holder securing hole 2d is formed through each extended portion 2c of the brush holder member 2 along the axial direction of the brush holder member 2 at positions corresponding to the securing pieces 6. The size of each holder securing hole 2d is set such that the corresponding engaging portion 6a can be inserted through the holder securing hole 2d. A pair of adjusting projections 2e is formed on each extended portion 2c of the brush holder member 2. The adjusting projections 2e slightly project along the axial direction on both sides of the corresponding holder securing hole 2d. The cross-sectional area of each adjusting projection 2e decreases toward the distal end.

Figure 4A:
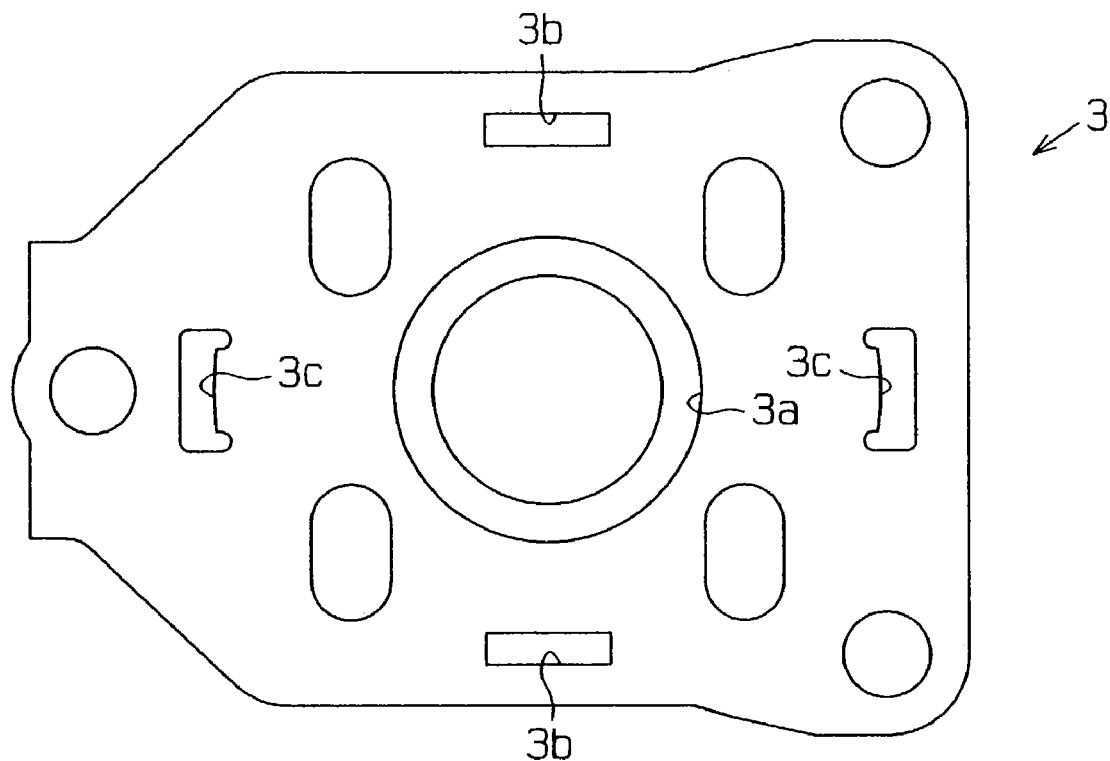
FIG. 4(a) is a plan view illustrating an end flame according the preferred embodiment.
Figure 4B:
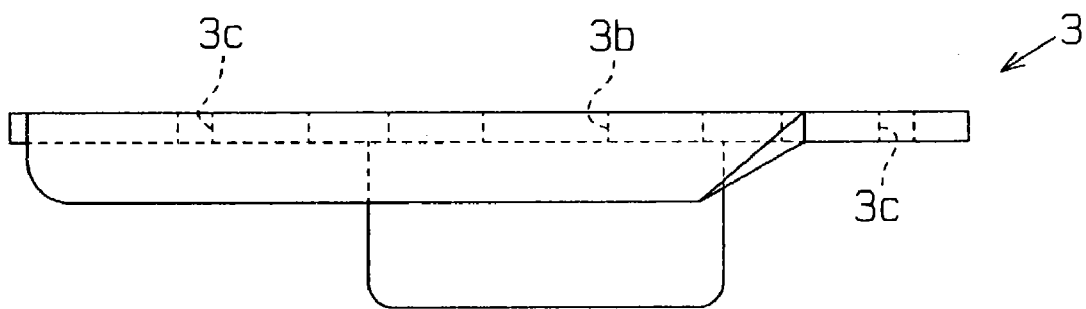
FIG. 4(b) is a side view illustrating the end flame.

As shown in FIGS. 2, 4(a), and 4(b), the end flame 3 is a substantially rectangular plate that substantially covers the opening portion 7 of the yoke 1. A substantially circular recess 3a is formed at the center of the end flame 3 for accommodating a bearing, which is not shown. As shown in FIG. 4(a), housing securing holes 3b are formed in the end flame 3.

Each housing securing hole 3b corresponds to one of the securing pieces 6 and one of the holder securing holes 2d. Also, engaging holes 3c are formed in the end flame 3. Each engaging hole 3c corresponds to one of the engaging pieces 1c.

The brush holder member 2 and the end flame 3 are simultaneously secured to the yoke 1 by securing the end flame 3 to the yoke 1 with the securing pieces 6 while sandwiching the brush holder member 2 between the end flame 3 and the yoke 1. More specifically, each securing piece 6 is inserted into one of the holder securing holes 2d. The engaging portion 6a of each securing piece 6 is press-fitted to the corresponding holder securing hole 2d. Thus, the brush holder member 2 is locked by the engaging portions 6a.

Then, each securing piece 6 is inserted into one of the housing securing holes 3b, and the foldable securing portion 6b of the securing piece 6 is folded.

In the preferred embodiment, the foldable securing portions 6b are opened and caulked. This secures the end flame 3 and the brush holder member 2 to the yoke 1. At the same time, each engaging piece 1c is fitted to one of the engaging holes 3c. Each extended portion 2c of the brush holder member 2 is secured by being sandwiched between one of the cut-out portions 8 of the yoke 1 and the upper surface of the end flame 3. Each adjusting projection 2e is squeezed in accordance with the force applied to the extended portion 2c when the extended portion 2c is sandwiched between one of the cut-out portions 8 of the yoke 1 and the upper surface of the end flame 3. Accordingly, the dimension between the brush holder member 2 and the yoke 1 is adjusted. When securing the brush holder member 2 and the end flame 3 to the yoke 1, an armature 10, which is shown by a broken line in FIG. 1, is substantially accommodated in the yoke 1. At this time, the supply brushes 9 are pressed against a commutator 10a (shown by a chain double-dashed line in FIG. 3(a)) of the armature 10.

The preferred embodiment provides the following advantages:

(1) The pair of securing pieces 6, which secures the brush holder member 2 and the end flame 3 to the yoke 1, is integrally formed with the yoke 1. Therefore, the number of parts is reduced as compared to a case where screws and the like are used. This reduces the number of assembling processes. Accordingly, the manufacturing cost of the motor is reduced. Also, displacement of the supply brushes 9 with respect to the magnets 5 in the circumferential direction is reduced as compared to a case where the brush holder member is secured to the end flame first, and then the end flame is secured to the yoke, that is, the brush holder member is indirectly secured to the yoke.

(2) The brush holder member 2 and the end flame 3 are simultaneously secured to the yoke 1 by securing the end flame 3 to the yoke 1 with the securing pieces 6 while sandwiching the brush holder member 2 between the end flame 3 and the yoke 1. Therefore, the brush holder member 2 and the end flame 3 are easily secured to the yoke 1 as compared to a case where the brush holder member is secured to the end flame first, and then the end flame is secured to the yoke.

(3) When each securing piece 6 is inserted into one of the holder securing holes 2d, and the engaging portion 6a of each securing piece 6 is press-fitted in the corresponding holder securing hole 2d, the brush holder member 2 is locked by the engaging portions 6a.

Therefore, the brush holder member 2 is reliably secured to the yoke 1 while easily locking the brush holder member 2.

(4) Each engaging portion 6a is formed such that the width of each engaging portion 6a increases toward the proximal end of the corresponding securing piece 6. Therefore, each engaging portion 6a is easily press-fitted in one of the holder securing holes 2d.

(5) The end flame 3 is secured to the yoke 1 by folding the foldable securing portion 6b, which is formed at the distal end of each securing piece 6. In this case, the end flame 3 is easily secured to the yoke 1 while keeping the shape of the securing pieces 6 simple.

(6) The dimension between the brush holder member 2 and the yoke 1 is adjusted by squeezing each adjusting projection 2e when each extended portion 2c is sandwiched between one of the cut-out portions 8 of the yoke 1 and the upper surface of the end flame 3. Therefore, play of the brush holder member 2 is reduced while permitting a slight dimensional tolerance in the axial direction of the brush holder member 2.

(7) Since the thickness of each securing piece 6 is the same as the thickness of the yoke 1, a process for forming the securing pieces 6 to have different thickness is unnecessary. This facilitates forming of the securing pieces 6.

(8) Since each securing piece 6 extends from one of the flat portions 1a of the yoke 1 before being secured to the brush holder member 2 and the end flame 3, a process for bending the securing pieces 6 is unnecessary. This facilitates forming of the securing pieces 6.

(9) Each securing piece 6 extends from one of the flat portions 1a, or more specifically, from the bottom of the cut-out portion 8, which is formed at the corresponding flat portion 1a. Therefore, as compared to a case where each securing piece 6 extends from one of the curved portions 1b, the securing pieces 6 are easily formed because it is only required to punch out holes in flat material using, for example, a pressing machine. Also, as compared to a case where securing pieces are extended from the curved portions 1b, the shapes of the holder securing holes 2d of the brush holder member 2 and the housing securing holes 3b of the end flame 3 are simplified.

(10) The extended portions 2c of the brush holder member 2 are secured by being sandwiched between the cut-out portions 8, which are cut out from the rim of the opening portion 7 of the yoke 1, and the upper surface of the end flame 3. Therefore, at least part of the brush holder member 2 is accommodated in the yoke 1. This prevents the axial length of the motor from being unnecessarily increased by the brush holder member 2.

(11) Since two securing pieces 6 are provided in the circumferential direction of the yoke 1, play of the brush holder member 2 and the end flame 3 with respect to the yoke 1 in the circumferential direction is further reduced. This further reduces the displacement of the supply brushes 9 with respect to the magnets 5 in the circumferential direction.

It should be apparent to those skilled in the art that the present invention may be embodied in many other specific forms without departing from the spirit or scope of the invention. Particularly, it should be understood that the invention may be embodied in the following forms.

Figure 5:
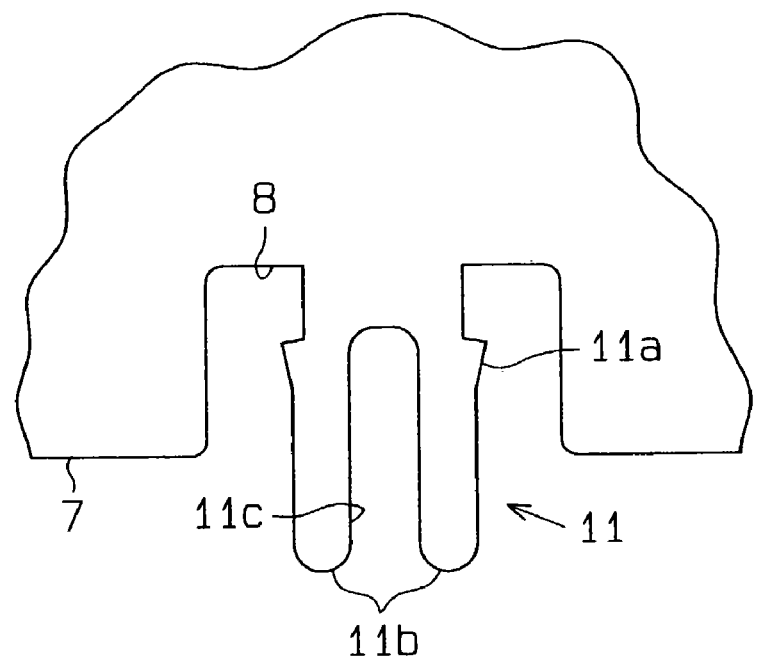
FIG. 5 is a side view illustrating a securing piece according to a modified embodiment.
Figure 6:
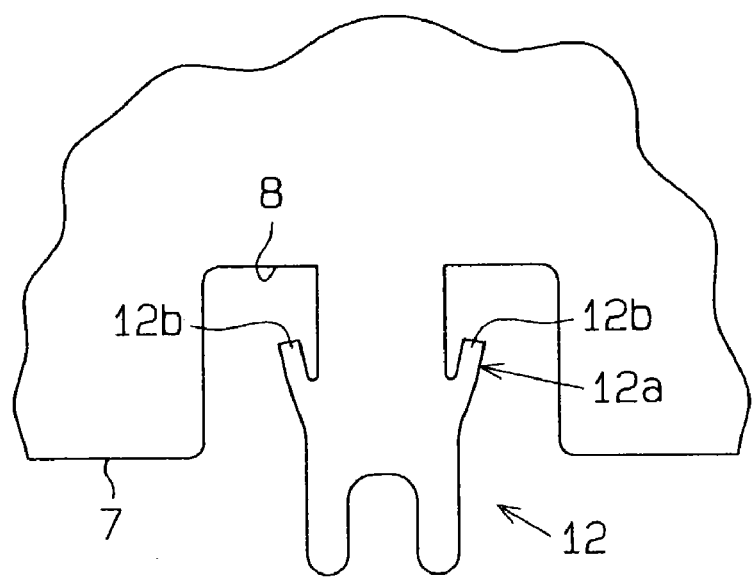
FIG. 6 is a side view illustrating a securing piece according to another modified embodiment.

The securing pieces 6 of the preferred embodiment may be modified to securing pieces 11, 12 as shown in FIGS. 5 and 6.

As shown in FIG. 5, a pair of engaging portions 11a is formed on both sides of the middle of each of securing pieces 11 for locking the brush holder member 2. Each engaging portion 11a is formed such that the width of the engaging portion 11a increases toward the proximal end of the securing piece 11 and the engaging portion 11a projects outward. A foldable securing portion 11b is formed at the distal end of each securing piece 11 for directly securing the end flame 3. A slit 11c is formed in each securing piece 11. Each slit 11c extends from the center of the distal end of each securing piece 11 toward the vicinity of the proximal end of the securing piece 11. Each slit 11c extends further than the engaging portions 11a of the securing piece 11. Thus, the foldable securing portion 11b is divided into two and is easily folded. Each slit 11c allows the corresponding engaging portions 11a to flex in the width direction (left and right direction as viewed in FIG. 5). This permits dimensional tolerance in the width direction of each engaging portion 11a and each holder securing hole 2d, to which the engaging portions 11a are press-fitted. Further, the engaging portions 11a are easily press-fitted.

As shown in FIG. 6, a pair of engaging portions 12a is formed on both sides of the middle of each of securing pieces 12 for locking the brush holder member 2. Each engaging portion 12a has an engaging projection 12b, which projects radially outward toward the proximal end of the securing piece 12. In this case, the engaging projection 12b of each engaging portion 12a is permitted to flex in the width direction (left and right direction as viewed in FIG. 6). This permits dimensional tolerance in the width direction of each engaging portion 12a and each holder securing hole 2d, to which the engaging portions 12a are press-fitted. Further, the engaging portions 12a are easily press-fitted.

In the preferred embodiment, the brush holder member 2 and the end flame 3 are simultaneously secured to the yoke 1 by securing the end flame 3 to the yoke 1 while sandwiching the brush holder member 2 between the end flame 3 and the yoke 1. However, the securing pieces 6 may be changed to other securing members integrally formed with the yoke as long as the brush holder member 2 and the end flame 3 can be secured to the yoke 1.

Each holder securing hole 2d of the preferred embodiment may be formed such that the width of the holder securing hole 2d increases toward the proximal end of the corresponding securing piece 6. In this case also, the engaging portions 6a are easily press fitted to the holder securing holes.

In the preferred embodiment, the engaging portions 6a may be changed to other shapes as long as the engaging portions 6a are press-fitted to the corresponding holder securing hole 2d when each securing piece 6 is inserted into the corresponding holder securing hole 2d.

In the preferred embodiment, the foldable securing portions 6b may be changed to other shapes as long as the end flame 3 can be secured to the yoke 1.

The adjusting projections 2e of the preferred embodiment may be omitted.

In the preferred embodiment, the thickness of the securing pieces 6 is the same as the thickness of the yoke 1, but may be changed to different thickness.

In the preferred embodiment, each securing piece 6 is formed such that the securing piece 6 and the corresponding flat portion 1a of the yoke 1 are located on the same plane before being secured to the brush holder member 2 and the end flame 3. However, the securing pieces 6 may be bent.

In the preferred embodiment, each securing piece 6 extends from one of the flat portions 1a of the yoke 1. However, each securing piece 6 may extend from one of the curved portions 1b. Also, the yoke 1 may be changed to a substantially cylindrical yoke that is not flattened.

In the preferred embodiment, the brush holder member 2 is secured by being sandwiched between the cut-out portions 8 and the top surface of the end flame 3. However, the brush holder member 2 may be secured by being sandwiched between the rim of the opening portion 7 other than where the cut-out portions 8 are formed and the end flame 3.

In the preferred embodiment, two securing pieces 6 are provided in the circumferential direction. However, three or more securing pieces 6 may be provided.

The end flame 3 of the preferred embodiment may be changed to a housing member that is secured to and covers the opening portion 7 of the yoke 1. For example, the end flame 3 may be changed to a gear housing for accommodating a reduction gear.

The present examples and embodiments are to be considered as illustrative and not restrictive and the invention is not to be limited to the details given herein, but may be modified within the scope and equivalence of the appended claims.

What is claimed is:
1. A motor comprising:
a yoke, wherein the yoke is substantially cylindrical and has an opening portion, and wherein magnets are secured to the inside of the yoke;
a brush holder member secured to the opening portion of the yoke, wherein the brush holder member retains a supply brush;

a housing member secured to the opening portion of the yoke on the outside of the brush holder member, wherein the housing member covers the opening portion; and a securing member formed integrally with the yoke, wherein the securing member secures the brush holder member and the housing member to the yoke, wherein the securing member comprises a pair of securing pieces, and wherein each securing piece simultaneously secures the housing member and the brush holder member to the yoke by sandwiching the brush holder member between the yoke and the housing member;

wherein holder securing holes are formed in the brush holder member, wherein each holder securing hole corresponds to one of the securing pieces, and wherein each holder securing hole extends in the axial direction of the yoke; and wherein an engaging portion is formed at a middle portion of each securing piece, and wherein, when each securing piece is inserted into one of the holder securing holes, the corresponding engaging portion locks the brush holder member.

2. The motor according to claim 1,
wherein, when inserted into one of the holder securing holes, each engaging portion locks the brush holder member, and
wherein each engaging portion is formed such that the width of the engaging portion increases toward the proximal end of the corresponding securing piece.

3. The motor according to claim 2, wherein a slit is formed in each securing piece, and wherein each slit extends from the distal end of the securing piece up to at least the corresponding engaging portion.

4. The motor according to claim 1, wherein a foldable securing portion is formed on each securing piece, and wherein, when the foldable securing portion is folded, the housing member is secured to the yoke.

5. A motor comprising:
a yoke, wherein the yoke is substantially cylindrical and has an opening portion, and wherein magnets are secured to the inside of the yoke;
a brush holder member secured to the opening portion of the yoke, wherein the brush holder member retains a supply brush;
a housing member secured to the opening portion of the yoke on the outside of the brush holder member, wherein the housing member covers the opening portion; and
a securing member formed integrally with the yoke, wherein the securing member secures the brush holder member and the housing member to the yoke, wherein the securing member comprises a pair of securing pieces, and wherein each securing piece simultaneously secures the housing member and the brush holder member to the yoke by sandwiching the brush holder member between the yoke and the housing member;
wherein an adjusting projection is formed on the brush holder member, wherein the adjusting projection projects along the axial direction of the yoke, and wherein the adjusting projection adjusts a dimension between the yoke and the housing member by being squeezed when sandwiched between the yoke and the housing member.

6. The motor according to claim 1, wherein, when press-fitted in one of the holder securing holes, each engaging portion locks the brush holder member, and wherein each engaging portion has an engaging projection, which projects outward toward the distal end of the corresponding securing piece.

7. The motor according to claim 1, wherein the thickness of the securing pieces is the same as the thickness of the yoke.

8. The motor according to claim 7, wherein the yoke is a flat type yoke that is formed substantially cylindrical by a pair of flat portions and a pair of curved portions, wherein the flat portions are parallel to each other, and wherein the curved portions connect the flat portions.

9. The motor according to claim 8, wherein the securing pieces are formed such that each securing piece and the corresponding flat portion of the yoke are located on the same plane before being secured to the brush holder member and the housing member.

10. The motor according to claim 1, wherein a cut-out portion is formed on a rim of the opening portion of the yoke, wherein the securing pieces extend from the periphery of the cut-out portion, and wherein the brush holder member is secured between the cut-out portion and the housing member.

11. A motor comprising:
a yoke, wherein the yoke is substantially cylindrical, and wherein the yoke has an opening portion;
a pair of magnets secured to the inside of the yoke;
a brush holder member secured to the opening portion of the yoke, wherein the brush holder member retains a pair of supply brushes;
a housing member secured to the opening portion of the yoke on the outside of the brush holder member, wherein the housing member covers the opening portion; and
a pair of securing pieces formed integrally with the yoke, wherein the securing pieces secure the brush holder member and the housing member to the yoke, wherein each securing piece simultaneously secures the housing member and the brush holder member to the yoke by sandwiching the brush holder member between the yoke and the housing member;
wherein holder securing holes are formed in the brush holder member, wherein each holder securing hole corresponds to one of the securing pieces, and wherein each holder securing hole extends in the axial direction of the yoke; and
wherein an engaging portion is formed at a middle portion of each securing piece, and wherein, when each securing piece is inserted into one of the holder securing holes, the corresponding engaging portion locks the brush holder member.

12. The motor according to claim 11,
wherein, when inserted into one of the holder securing holes, each engaging portion locks the brush holder member, and
wherein each engaging portion is formed such that the width of the engaging portion increases toward the proximal end of the corresponding securing piece.

13. The motor according to claim 12, wherein a slit is formed in each securing piece, and wherein each slit extends from the distal end of the securing piece up to at least the corresponding engaging portion.

14. The motor according to claim 11, wherein a foldable securing portion is formed on each securing piece, and wherein, when the foldable securing portion is folded, the housing member is secured to the yoke.

15. A motor comprising:
- a yoke, wherein the yoke is substantially cylindrical and has an opening portion, and wherein magnets are secured to the inside of the yoke;
- a brush holder member secured to the opening portion of the yoke, wherein the brush holder member retains a supply brush;
- a housing member secured to the opening portion of the yoke on the outside of the brush holder member, wherein the housing member covers the opening portion; and
- a securing member formed integrally with the yoke, wherein the securing member secures the brush holder member and the housing member to the yoke, wherein the securing member comprises a plurality of securing pieces, and wherein each securing piece simultaneously secures the housing member and the brush holder member to the yoke by sandwiching the brush holder member between the yoke and the housing member;
- wherein holder securing holes are formed in the brush holder member, wherein each holder securing hole corresponds to one of the securing pieces, and wherein each holder securing hole extends in the axial direction of the yoke; and
- wherein an engaging portion is formed at a middle portion of each securing piece, and wherein, when each securing piece is inserted into one of the holder securing holes, the corresponding engaging portion locks the brush holder member.

* * * * *